(12) United States Patent
Rossi et al.

(10) Patent No.: US 6,744,937 B1
(45) Date of Patent: Jun. 1, 2004

(54) METHOD, DATA PROCESSING EQUIPMENT AND PROGRAM FOR CORRECTING SCANNING ERRORS AS WELL AS ASSOCIATED TEXT RECOGNITION SYSTEM

(75) Inventors: Rainer Rossi, Delbrueck (DE); Wolfgang Weiss, Paderborn (DE)

(73) Assignee: Wincor Nixdorf GmbH & Co. KG, Paderborn (DE)

( * ) Notice: Subject to any disclaimer, the term of this patent is extended or adjusted under 35 U.S.C. 154(b) by 619 days.

(21) Appl. No.: 09/716,602

(22) Filed: Nov. 20, 2000

(30) Foreign Application Priority Data

Nov. 24, 1999 (DE) .......................... 199 56 467

(51) Int. Cl.⁷ ................................ G06K 9/03
(52) U.S. Cl. ................ 382/309; 382/310; 382/318; 358/474; 358/486; 358/494
(58) Field of Search ................. 382/299, 309; 358/450, 473, 474, 488, 408, 486, 487, 489, 491, 493, 494, 496, 497, 505, 506; 359/196, 204, 212, 216, 217, 223, 230, 231; 348/739, 746, 757; 347/235, 236, 237, 250; 714/6, 48, 54, 52, 53, 55, 57, 701, 703, 704, 705, 723, 746, 751, 753, 754, 758, 764, 768, 774, 786

(56) References Cited

U.S. PATENT DOCUMENTS

| | | | | | |
|---|---|---|---|---|---|
| 4,370,641 A | * | 1/1983 | Kantor et al. | ................ | 382/289 |
| 5,923,790 A | * | 7/1999 | Miwa et al. | ................ | 382/289 |
| 5,949,922 A | * | 9/1999 | Wada et al. | ................ | 382/295 |
| 5,999,666 A | * | 12/1999 | Gobeli et al. | ................ | 382/313 |
| 6,005,681 A | * | 12/1999 | Pollard | ........................ | 358/473 |
| 6,538,717 B2 | * | 3/2003 | Nakamura et al. | ............ | 355/40 |

FOREIGN PATENT DOCUMENTS

| | | |
|---|---|---|
| DE | DT 25 16 961 A | 10/1975 |
| EP | 0 174 659 | 3/1986 |
| EP | 0 565 335 A1 | 10/1993 |

* cited by examiner

Primary Examiner—Jayanti K. Patel
Assistant Examiner—Abolfazl Tabatabai
(74) Attorney, Agent, or Firm—McCormick, Paulding & Huber LLP

(57) ABSTRACT

It is explained, inter alia, a method for correcting scanning errors, wherein after the scanning operation (step 202) scanning errors are eliminated dependent on a deviation of the scanning speed from a required scanning speed (step 210).

10 Claims, 5 Drawing Sheets

METHOD, DATA PROCESSING EQUIPMENT AND PROGRAM FOR CORRECTING SCANNING ERRORS AS WELL AS ASSOCIATED TEXT RECOGNITION SYSTEM

FIELD OF THE INVENTION

The present invention relates to a method for correcting scanning errors, wherein picture elements of a document are successively scanned at a scanning speed along a scanning direction. During the scanning operation image data with a scanning resolution in scanning direction are generated.

BACKGROUND OF THE INVENTION

During scanning, either the document to be scanned or the scanning device is moved, see for example, flat-bed scanners or scanners having a document feeder. The relative movement between the document and the scanning device is mostly generated with the help of motors, in particular stepper motors. The document is scanned in a scanning direction which corresponds to the direction of the relative movement between the document and the scanning device. This scanning direction is also referred to as main scanning direction. Lines are scanned along a sub-scanning direction which is transverse to the main scanning direction. The picture elements of one line are either scanned simultaneously, e.g. with the help of a line of photodiodes, or also successively, e.g. by using a laser scanner having a rotating polygon mirror.

By resolution one understands the number of picture elements per unit of length. Internationally, one inch is used as reference unit of length, i.e. 25.4 mm. The resolution used for scanning is strictly determined in the sub-scanning direction when using a photodiode-line. In the main scanning direction the resolution depends inter alia on the quantity of the relative velocity between the document to be scanned and the scanning device.

In known scanning methods the relative velocity between the document to be scanned and the scanning device is factory-determined. This is effected, for example, by small manufacturing tolerances or by adjustment. Scanning errors are avoided by means of lens systems, e.g. by means of f-θ-lenses, or by appropriate measures regarding the control of the scanning operation.

It is the object of the invention to provide a simple method for correcting scanning errors. Further, a data processing equipment suitable for performing the method, a program suitable for performing the method as well as a text recognition system are to be provided, in which the method is applied.

SUMMARY OF THE INVENTION

The object concerning the method is solved by a method having the process steps indicated in claim 1. Embodiments are provided in the subclaims.

The invention is based on the recognition that a constant scanning speed is guaranteed for the individual scanning devices throughout the entire image to be scanned. However, the scanning speeds of different scanning devices differ from one another. This is, for example, due to aging and wear of mechanical components as well as to tolerances during the manufacturing of the scanning devices. However, the same methods are used for processing the image data generated during the scanning operation. Thus, also the scanning speed has a decisive influence on the scanning errors.

Therefore, in the method according to the invention, after the scanning operation, scanning errors are eliminated dependent on the deviation of the scanning speed from a required scanning speed. By this measure the scanning errors which are to be traced back to a different scanning speed are eliminated. Even in the case of different scanning speeds between different scanning devices the same images are at last represented by the image data. In the case of further processing by using the same software, the same results are obtained.

In particular, if the document is moved during the scanning operation, differences between the scanning speeds of various similarly structured scanning devices cannot be avoided. For example, the coefficient of friction of transport rolls, which act on the surface of the document to be scanned, varies time-dependently. By means of the method according to the invention scanning errors, which can be traced back to such causes, can be compensated.

In one embodiment of the method according to the invention, the image data are processed such that the image which is represented by the image data is compressed or stretched in the direction of scanning. If the document has been scanned too fast due to a too high relative velocity between the document and the scanning device, the image has to be stretched. If the document, on the other hand, has been scanned too slow, the image represented has to be compressed. For compressing and stretching, respectively, the methods known from the image processing technology are used. Compressing and stretching, however, can also be done by inserting or deleting lines, respectively, e.g. each tenth line is deleted.

In another embodiment, the resolution of the image represented by the image data is varied. When varying the resolution, the image data themselves remain unchanged. This is a very simple possibility of eliminating the scanning errors which are due to the difference between the actual scanning speed and the required scanning speed. The resolution is a parameter which shall apply to the entire image to be scanned. Consequently, only one parameter has to be varied in order to eliminate the scanning errors which have arisen during the entire scanning operation. Changing the value for the resolution is a very reliable way of eliminating all imaging errors if the scanning speed is constant during the scanning of the entire image and only has different values between different scanning devices.

In one embodiment, the resolution is varied by means of a correction factor which is a measure of the difference between the length of the document in scanning direction and the length in scanning direction of the image represented by the image data with scanning resolution. In a further embodiment, the correction factor is calculated according to the following formula:

$$KF=LB/L$$

wherein KF is the correction factor,

L is the length of the document in scanning direction, and
LB is the length of the image represented by the image data in scanning direction. The correction factor KF can be calculated by a single division operation and thus in a simple manner. The altered value for the resolution results from multiplying the correction value KF by the scanning resolution. The length LB is directly connected with the scanning speed.

If the scanning speed is low, more picture elements are scanned. The length LB is comparatively high. According to the above-indicated formula the correction factor KF becomes greater than one in this case. By increasing the resolution on the basis of the high correction factor KF it is achieved that the length in scanning direction of the image represented by the image data is reduced with the corrected resolution and corresponds to the length of the document being scanned. The scanning error resulting from the deviation of the required scanning speed from the actual scanning speed has been corrected.

If the length LB of the image represented by the image data in scanning direction with scanning resolution is smaller than the length L of the document, a correction factor KF smaller than one results. The corrected resolution is thus smaller than the scanning resolution. By decreasing the resolution it is achieved that the length in scanning direction of the image represented by the image data is increased and corresponds to the length of the document being scanned. The scanning error due to the deviation of the required scanning speed from the actual scanning speed has been corrected.

The length L of the document to be scanned is, for example, entered by an operator or is determined by means of an appropriate method. Use is made of methods for determining the length of the entire document to be scanned or the length of a marking given on the document to be scanned. A simple way of determining the length of the document is to estimate the length on the basis of the length of the image represented by the image data in scanning direction. In doing so from predetermined lengths for the document the one length is chosen which deviates least from the length of the scanned image in scanning direction and with scanning resolution.

In one embodiment of the method according to the invention the image data free of scanning errors are processed by means of a method for recognizing characters. For carrying out the recognition method the characters which are to be recognized are searched for at predetermined length coordinates. In this embodiment, the recognition rate can considerably be increased since the recognition method used is sensitive to deviations of the characters to be recognized from their predetermined positions. A high recognition rate is only guaranteed if the characters to be recognized are accurately positioned at their predetermined coordinates. This can be achieved by correcting the scanning errors which are due to a deviation of the actual scanning speed from the required scanning speed.

Further, the invention relates to a data processing equipment for correcting scanning errors, a text recognition device as well as a program for correcting scanning errors. In the data processing equipment according to the invention and in the text recognition device according to the invention the method according to the invention or its embodiments are performed. The program, too, serves for performing the method according to the invention or its embodiments. Thus, the above-mentioned technical effects shall also apply to the data processing equipment, the text recognition device and the program.

BRIEF DESCRIPTION OF THE DRAWINGS

In the following, embodiments of the invention are explained with reference to the enclosed drawings.

DETAILED DESCRIPTION OF THE PREFERRED EMBODIMENTS

Figure 1:
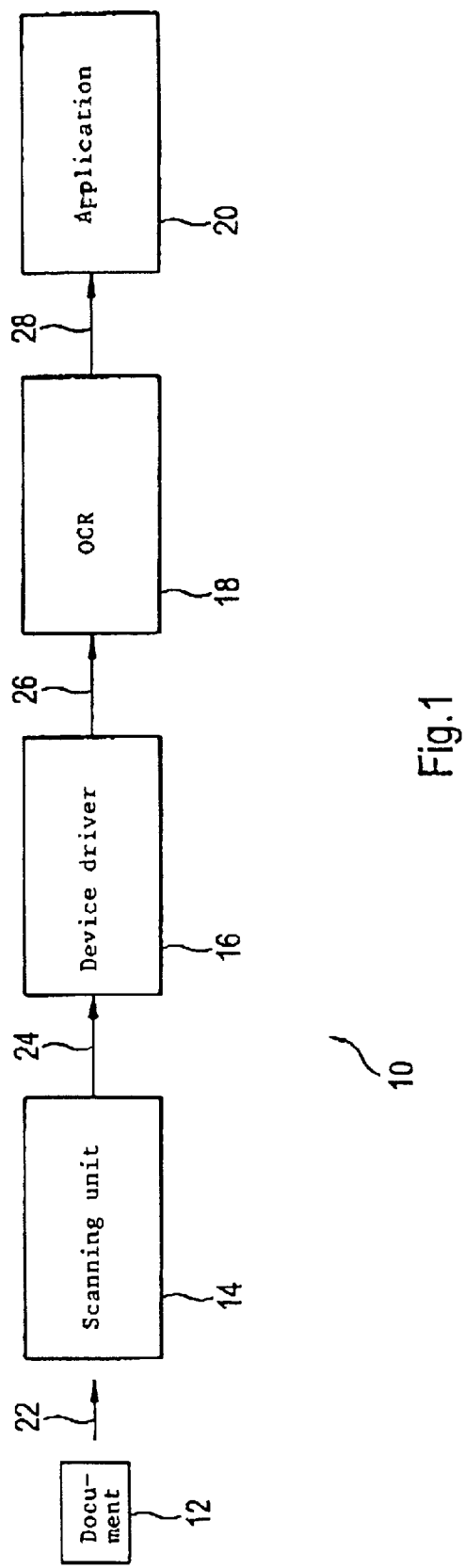
FIG. 1 shows a text recognition device.

FIG. 1 shows a text recognition device 10 for recognizing the text represented on a document 12. The text recognition device 10 includes a scanning unit 14, a device driver 16, a text recognition program 18 as well as an application program 20.

The scanning unit 14 serves to scan the document 12, see arrow 22. The scanning unit 14 includes a commercial scanning device, e.g. a scanner having a document feeder, which scans the document with a resolution of 300 dpi (dots per inch). That means that 300 picture elements, e.g. pixels, are scanned over a distance of 25.4 mm. The scanning unit 14 generates a so-called pixel image, in which the picture elements are arranged matrix-like. Image data 24 of the pixel image are transferred from the scanning unit 14 to the device driver 16.

The device driver 16 includes a program which generates an image file 26 from the image data 24. The image file 26 includes besides the image data inter alia information on the size of the image in horizontal x-direction and vertical y-direction. The device driver 16 further serves to control the scanning unit 14 in response to instructions generated by an operator. The image file 26 is transferred from the device driver 16 to the text recognition program 18.

The text recognition program 18 processes the image file 26 transferred from the device driver 16 and converts characters in predetermined fields into text character chains 28. For example, from the image of the letter "A" the hexadecimal value "30" is generated, which is assigned to the letter "A". The text characters 28 encoded in such a way are transmitted to the application program 20. The text recognition program 18 is also referred to as "optical character recognition" program, abbreviated OCR-program.

In the application program 20, the text data are interpreted, by, for example, carrying out transfers. In doing so money is credited to different accounts.

Figure 2:
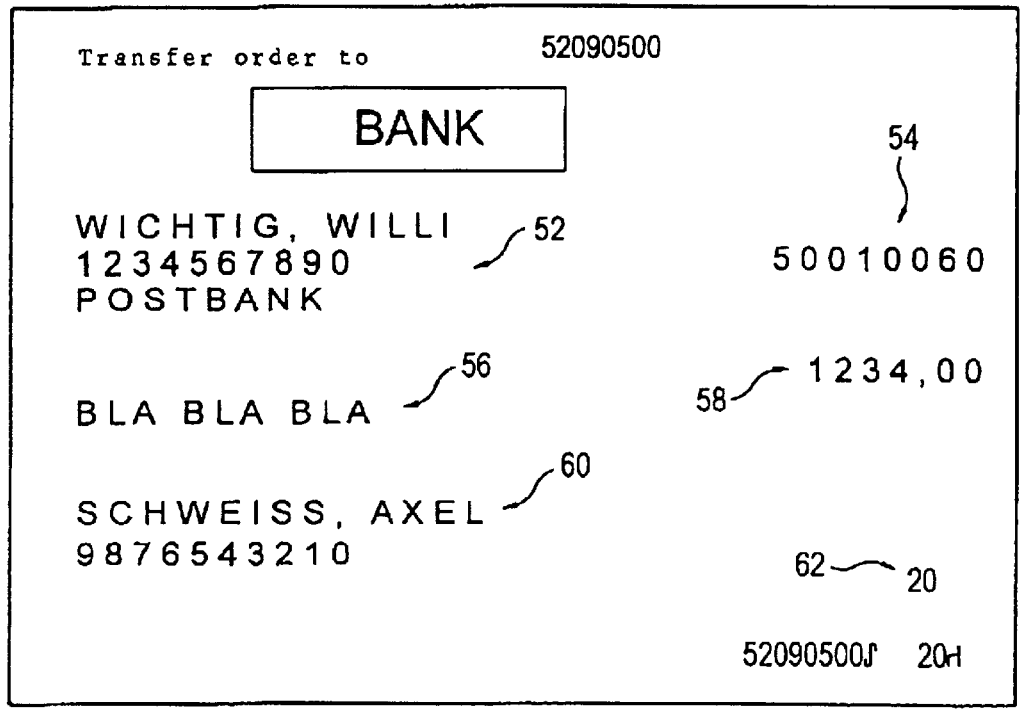
FIG. 2 shows a document to be scanned.

FIG. 2 shows a document 50 to be scanned for a transfer form having the read fields 52 to 62. In the read fields 52 to 60 handwritten details are entered which are necessary for a transfer form. The read fields 52 to 60 include in the following order details on the transfer receiver, on the bank code number of the transfer receiver, on the transfer reason, on the amount of transfer as well as on the issuer of the transfer. In the read field 62 the value 20 is indicated. With the help of this value the text recognition program 18, see FIG. 1, is able to read the positions of the read fields 52 to 60 from a table.

The document 50 has a predetermined length L of, for example, 145 mm, in scanning direction R. The length L is the same for all transfer forms of one type.

Figure 3:
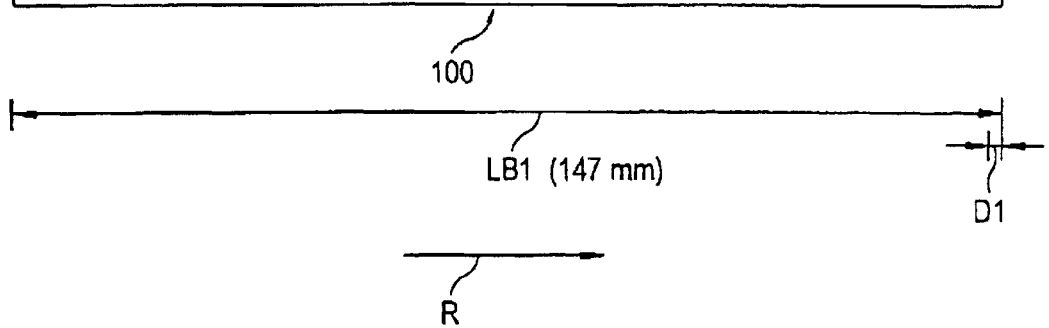
FIG. 3 shows the image of a document which has been scanned too slow.

FIG. 3 shows the image 100 of a document 50 which has been scanned too slow. In scanning direction the image 100 of the document 50, see FIG. 2, has a length LB1=147 mm which is longer than the length L of the document 50. The length LB1 is longer than the length L by an amount of difference D1=2 mm. Thus, the image 100 is stretched compared to the document 50. Image sections 102 to 112 correspond in this order to the read fields 52 to 62. Owing to the stretching of the image 100, the positions of the image sections 102 to 112 in the image 100 deviate from the required positions of the read fields 52 to 62 in the document 50. The deviation of the positions is greater for the read fields 54, 58 and 62, which have been scanned last, and for the corresponding image sections 104, 108 and 112, respectively, than for the image sections 102, 106 and 110. This is due to the fact that the scanning errors, which are to be traced back to the too slow scanning, add up.

Figure 4:
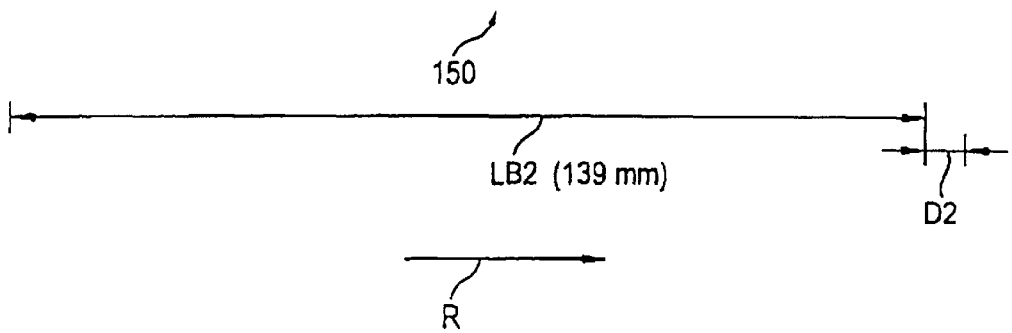
FIG. 4 shows the image of a document which has been scanned too fast.

FIG. 4 shows an image 150 of a document 50 which has been scanned too fast, see FIG. 2. Due to the too fast scanning the image 150 has less picture elements than an image which has been generated of the document 50 with the required scanning speed. Therefore, the image 150 is compressed compared to the document 50.

The image 150 has a length LB2 in scanning direction R of, for example, 139 mm. Thus, the length LB2 is shorter than the length L of the document 50 by an amount of difference D2=6 mm.

Image sections 152 through 162 are images of the read fields 52 through 62. Due to the too fast scanning operation the positions of the read fields 152 through 162 in the image 150 deviate from the positions predetermined by the read fields 52 through 62 in the document 50. The images 154, 158 and 162 of the read fields 54, 58 and 62 scanned last are considerably closer to the left edge of the image 150 than the read fields 54, 58 and 62 at the edge of the document 50. Also in the case of a too fast scanning, the scanning errors add up during the scanning operation.

Figure 5:
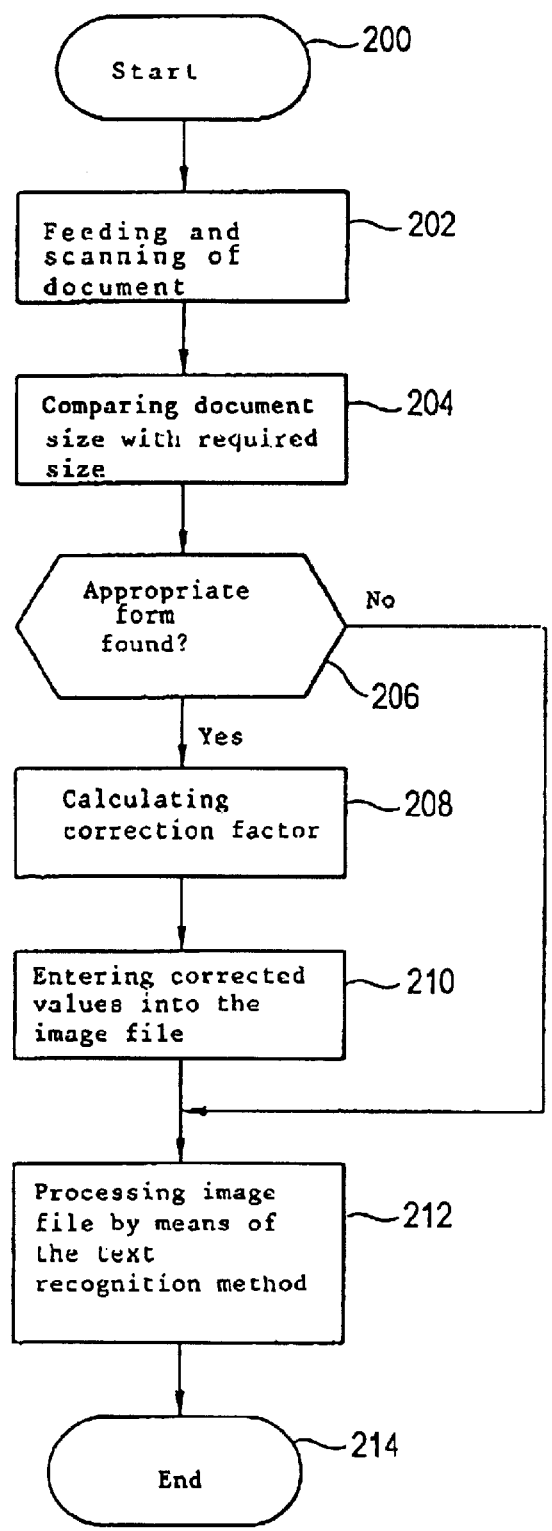
FIG. 5 is a flow chart showing the process steps for correcting scanning errors.

FIG. 5 shows a flow chart with the process steps for correcting scanning errors which are due to differences in speed during the scanning operation. When explaining FIG. 5, reference is also made to FIGS. 1 through 4.

The method starts with a step 200. The document 50 to be scanned is placed into the document feeder of the scanning unit 14 by an operator.

In the following step 202, the operator causes the feeding of the document 50 by transmitting an instruction to the device driver 16. The scanning unit 14 scans the document 50. The scanning speed depends on the adjustments made on the scanning unit in the factory. Furthermore, the scanning speed varies due to wear of the scanning unit 14.

Deviations of the scanning speed from a required scanning speed result in different lengths of the images generated during scanning, see the too long image according to FIG. 3 and the too short image according to FIG. 4. In step 204 a length of the image generated during scanning is determined. The length is compared with a required length. If required measures of, for example, 135 mm for a first transfer form and of 145 mm for the transfer form according to document 50 are predetermined, a length and thus a document is chosen which deviates least from the determined length. In the embodiment, document 50 is chosen.

In a next step 206 it is verified whether a document has been determined in step 204. If this is the case a step 208 follows directly after step 206. If no appropriate document has been determined in step 204 due to a too great deviation from the predetermined required measures, a step 212, which will be explained further below, follows directly after step 206.

If an appropriate document has been determined in step 204, a correction factor KF is determined in step 208 according to the following formula:

$$KF=LB/L,$$

wherein KF is the correction factor,

LB is the length of the image in scanning direction, which image is represented by the image data generated during scanning, and L is the length of the document determined in step 204 and measured in scanning direction. For the image 100 explained with reference to FIG. 3, the correction factor is KF=LB1/L=1.018. For the image 150 explained with reference to FIG. 4, there results a correction factor KF=LB2/L=0.959.

After step 208 there follows a step 210, in which corrected values for the resolution of the image file 26 generated by the device driver 16 are calculated. The scanning resolution is multiplied by the correction factor KF determined in step 208 in order to obtain the corrected value for the resolution. For the image 100 according to FIG. 3 there results a corrected resolution of 300 dpi*1.018=304 dpi. For the image 150 explained with reference to FIG. 4, there is: 300 dpi*0.959=288 dpi.

After step 210 follows a step 212. Step 212 is also performed directly after step 206 if in step 204 no suitable document has been determined. In step 212, the image file 26 is processed with the help of the text recognition program 18. For the resolution of the image either the value determined in step 210 is used or the value of the scanning resolution of 300 dpi is used. By means of the correction performed in step 210, the recognition rate of the text recognition program 18 can be increased.

In a step 214, the method is terminated. The characters recognized in step 212 can now be processed by the application program 20.

In another embodiment a correction of the resolution in x-direction and in y-direction is carried out. Two correction factors KF are determined with which the resolution in x-direction as well as the resolution in y-direction are corrected.

| List of reference numerals | |
|---|---|
| 10 | text recognition device |
| 12 | document |
| 14 | scanning unit |
| 16 | device driver |
| 18 | text recognition program |
| 20 | application program |
| 22 | arrow |
| 24 | image data |
| 26 | image file |
| 28 | character chain |
| 50 | document |
| 52 through 62 | read field |
| L, LB1, LB2 | length |
| 100 | image of the document |
| 102 through 108 | image section |
| D1 | amount of difference |
| 150 | image of the document |
| 152 through 162 | image section |
| D2 | amount of difference |
| 200 | start |
| 202 | feeding and scanning of the document |
| 204 | comparing required size with image size |
| 206 | appropriate format found? |
| 208 | calculating correction factor |
| 210 | entering corrected resolution into image file |
| 212 | processing image file by means of the text recognition method |
| 214 | end |
| R | scanning direction |

What is claimed is:

1. A method for correcting scanning errors, wherein picture elements of a document (50) are successively scanned at a scanning speed along a scanning direction (R), wherein during the scanning operation image data (24) are generated with a scanning resolution in scanning direction (R), and wherein after the scanning operation scanning errors are eliminated dependent on a deviation of the scanning speed from a required scanning speed, including varying the resolution of an image (100, 150) represented by the image data (24) using a correction factor, which is a measure of the deviation of a length of the document (50) in scanning direction (R) from a length in scanning direction (R) of the image (100, 150) represented by the image data (24).

2. A method according to claim 1, characterized in that the image data (24) are processed such that the image (100, 150) represented by the image data is compressed or stretched in scanning direction (R) (steps 208, 210).

3. A method according to claim 1, characterized in that the resolution of the image (100, 150) represented by the image data (24) is varied (step 210), and that the image data (24) remain unchanged when varying the resolution.

4. A method according to claim 3, characterized in that the resolution is only varied once per scanned image (100, 150).

5. A method according to claim 3, characterized in that the image data (26) free of scanning errors are processed by means of a method for recognizing characters (step 212), and that the recognition of the characters is carried out with the help of predetermined length coordinates, at which a character to be recognized is to be searched for.

6. A method according to claim 1, characterized in that the correction factor (KF) is calculated according to the following formula:

$$KF = LB/L,$$

wherein KF is the correction factor,

LB is the length of the image (100, 150) represented by the image data (26) in scanning direction (R) with scanning resolution, and L is the length of the document (50) in scanning direction (R).

7. A method according to claim 6, characterized in that a value for the length (L) of the document (50) in scanning direction (R) is predetermined by an operator, or that the length (L) of the document (50) in scanning direction (R) is determined, or that the length (L) of the document (50) is determined by means of a comparison between the length (LB) of the image (100, 150) with scanning resolution and predetermined values for the length (L) of the document (50) (step 204).

8. A data processing equipment (10) for correcting scanning errors, comprising a memory for storing a sequence of instructions, a processor for executing the instructions of the sequence of instructions, characterized in that during the execution of the sequence of instructions scanning errors occurring during the generation of image data (24, 26) by means of successive scanning of a document (50) are compensated for dependent on a deviation of the scanning speed from a required scanning speed, including varying the resolution of an image (100, 150) represented by the image data (24) using a correction factor, which is a measure of the deviation of a length of the document (50) in scanning direction (R) from a length in scanning direction (R) of the image (100, 150) represented by the image data (24).

9. A text recognition device (10), comprising a scanning device (14) for scanning the picture elements of a document along a scanning direction (R) and for generating image data, a data processing equipment which, during the execution of a sequence of instructions, compensates for scanning errors occurring during the generation of image data (24,26) by means of successive scanning of a document (50) dependent on a deviation of the scanning speed from a required scanning speed, including varying the resolution of an image (100, 150) represented by the image data (24) using a correction factor, which is a measure of the deviation of a length of the document (50) in scanning direction (R) from a length in scanning direction (R) of the image (100, 150) represented by the image data (24), and a text recognition unit (18), which recognizes characters at predetermined positions of the image (100, 150) represented by the image data (26).

10. A program for correcting scanning errors, comprising a sequence of instructions which can be executed by the processor of a data processing equipment (10), characterized in that the data processing equipment (10) is caused during execution of the sequence of instructions to compensate for scanning errors occurring during generation of image data (24, 26) by means of successive scanning of picture elements of a document (50) along a scanning direction (R) dependent on a deviation of the scanning speed from a required scanning speed, including varying the resolution of an image (100, 150) represented by the image data (24, 26) using a correction factor, which is a measure of the deviation of a length of the document (50) in scanning direction (R) from a length in scanning direction (R) of the image (100, 150) represented by the image data (24).

* * * * *